US010225307B2

(12) United States Patent
Bradley et al.

(10) Patent No.: US 10,225,307 B2
(45) Date of Patent: *Mar. 5, 2019

(54) STREAMING AND DOWNLOADING OF CONTENT

(71) Applicant: Comcast Cable Communications, LLC, Philadelphia, PA (US)

(72) Inventors: Bruce Bradley, Wayne, PA (US); Robert Knee, Lansdale, PA (US)

(73) Assignee: Comcast Cable Communications, LLC, Philadelphia, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/390,007

(22) Filed: Dec. 23, 2016

(65) Prior Publication Data

US 2017/0331871 A1    Nov. 16, 2017

Related U.S. Application Data

(63) Continuation of application No. 13/782,655, filed on Mar. 1, 2013, now Pat. No. 9,565,228.

(51) Int. Cl.
| | | |
|---|---|---|
| G06F 15/16 | (2006.01) | |
| H04L 29/06 | (2006.01) | |
| H04N 21/24 | (2011.01) | |
| H04N 21/262 | (2011.01) | |
| H04N 21/472 | (2011.01) | |
| H04N 21/845 | (2011.01) | |

(52) U.S. Cl.
CPC .......... *H04L 65/602* (2013.01); *H04L 65/80* (2013.01); *H04N 21/2407* (2013.01); *H04N 21/26216* (2013.01); *H04N 21/472* (2013.01); *H04N 21/845* (2013.01)

(58) Field of Classification Search
USPC ........................................................ 709/231
See application file for complete search history.

(56) References Cited

U.S. PATENT DOCUMENTS

| | | |
|---|---|---|
| 6,526,041 B1 | 2/2003 | Shaffer et al. |
| 7,577,751 B2 | 8/2009 | Vinson et al. |
| 2002/0095683 A1 | 7/2002 | Watanabe |
| 2005/0165911 A1 | 7/2005 | Homiller |
| 2009/0006581 A1 | 1/2009 | Bresser |
| 2014/0019633 A1 | 1/2014 | Zhang et al. |
| 2015/0288530 A1 | 10/2015 | Oyman |

*Primary Examiner* — Hee Soo Kim
(74) *Attorney, Agent, or Firm* — Banner & Witcoff, Ltd.

(57) ABSTRACT

Methods, apparatuses, systems, and software are described for providing content to a device comprising streaming content and sending content in a non-streaming manner (e.g., by downloading a file containing the content). In some aspects, switching between streaming and downloading may be performed in a dynamic manner during presentation of the content, and may be seamless to the user's viewing experience.

20 Claims, 10 Drawing Sheets

STREAMING AND DOWNLOADING OF CONTENT

CROSS-REFERENCE TO RELATED APPLICATIONS

This application is a continuation of U.S. Pat. No. 9,565,228 filed Mar. 1, 2013, entitled "STREAMING AND DOWNLOADING OF CONTENT," which is incorporated herein by reference.

BACKGROUND

When a user requests a video asset, there may be a delay in displaying content until a sufficient portion of the asset has been cached on the customer's viewing device, and/or until sufficient bandwidth is available to deliver the content. Caching may be implemented to help prevent lag and delay during actual viewing of the content. The amount of delay can be quite variable and unpredictable. For instance, network congestion can reduce the amount of bandwidth available to reliably send the asset to the user, thereby increasing the initial delay and/or potentially causing interruptions during content delivery and/or presentation. Moreover, there may be a high rate of requests for viewing a popular asset, which may cause problems with delivery of that asset.

SUMMARY

In one or more aspects, the present disclosure provides ways to switch between streaming content and sending content in a non-streaming manner (e.g., by downloading a file containing the content). For example, the switching may be performed in a dynamic manner during processing and/or presentation of the content, and may be seamless (e.g., undetectable) to a user's viewing experience.

In one or more further aspects, content may be sent to the user in at least two different ways, e.g., both streamed and downloaded. The streaming transmission may be streamed over a streaming channel, and the downloaded content may be sent over a different data channel. The content may be sent at the same quality (e.g., bit rate) or at different qualities over the two channels. A network component and/or the user device (e.g., a client, a gateway, a set top box, a smartphone, etc.) may intelligently decide whether to stream the content (or portion thereof) only, download the content (or portion thereof) only, or both stream and download the content (or portion thereof) to the user. In some cases, the streaming and downloading may be performed simultaneously or at least partially simultaneously, during the same timeframe, and/or otherwise at varying times. For example, when a user requests an item of content, the network and/or content provider may immediately begin (e.g., in real-time) streaming the content to the user. In addition, a data file containing the content may also be sent to the same user. When a sufficient amount of the data file has been delivered to the user (and/or an associated home or network device), consumption (e.g., viewing) of the content may be seamlessly switched to consumption of the content from the downloaded data file, and the data stream may be terminated.

At least some aspects are directed to, for example, a method, apparatus, system, and/or software for performing at least the following: streaming first data representing at least a first portion of content to a device, and sending such as during the same timeframe as said streaming, second data representing at least a second portion of the content to the device. The streaming may be stopped responsive to a threshold amount of the second data being sent to and/or received by the device during said sending.

As another example, further aspects as described herein are directed to a method, apparatus, system, and/or software for performing at least the following: streaming first data representing at least a first portion of content to a device, and sending, such as during the same timeframe as said streaming, second data representing at least a second portion of the content to the device. The streaming may be stopped during said sending, and said sending may continue as will be discussed herein.

In yet another example, a method, apparatus, system, and/or software are disclosed for performing at least the following: sending, over a communication link, first data representing at least a first portion of content to a device, determining an amount of usage of the communication link during the sending, and determining, based on the determined amount of usage, whether to initiate streaming. If so, second data representing at least a second portion of the content may be streamed to the device. The sending may be stopped after the streaming is initiated, such that the streaming continues after the sending is stopped.

These features are merely examples, and further features and details are discussed below.

BRIEF DESCRIPTION OF THE DRAWINGS

Some features herein are illustrated by way of example, and not by way of limitation, in the figures of the accompanying drawings and in which like reference numerals refer to similar elements.

DETAILED DESCRIPTION

Figure 1:
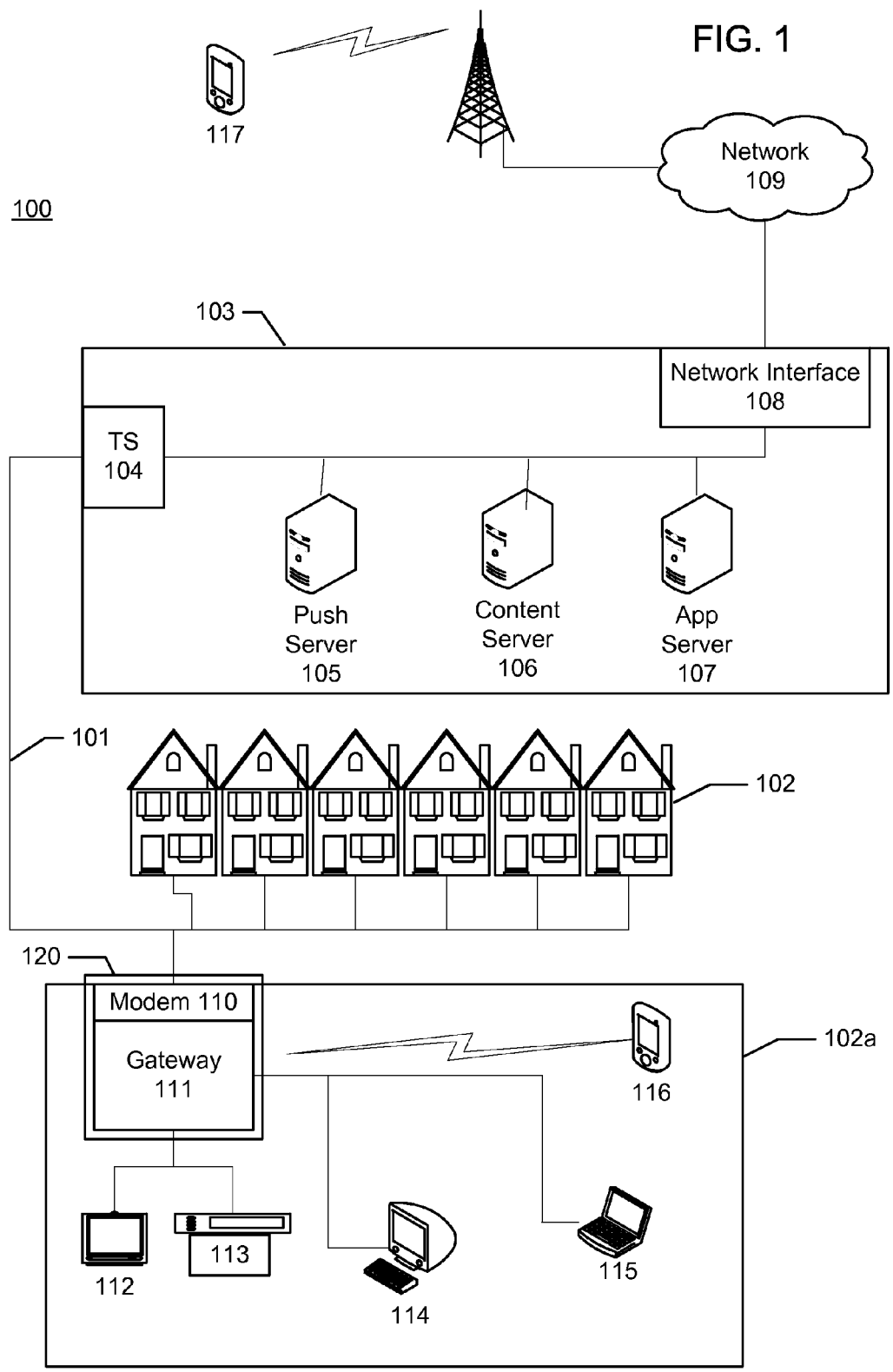
FIG. 1 illustrates an example information access or distribution network.

FIG. 1 illustrates an example information distribution network 100 on which many of the various features described herein may be implemented. Network 100 may be any type of information distribution network, such as satellite, telephone, cellular, wireless, etc. One example may be a wireless network, an optical fiber network, a coaxial cable network or a hybrid fiber/coax (HFC) distribution network. Such networks 100 use a series of interconnected communication links 101 (e.g., coaxial cables, optical fibers, wireless links, etc.) to connect multiple homes 102 or other user locations to a local office or other processing facility 103. The processing facility 103 may transmit downstream information signals onto the links 101, and each home 102 may have a receiver used to receive and process those signals. Various signals may be provided to each home 102 via one or more paths and/or may originate from one or more sources. For example, quadrature amplitude modulation (QAM) streamed video content may originate from one or more QAMs at local office 102, whereas Internet Protocol (IP) streamed video content may originate from another location such as a central office.

There may be one link 101 originating from the processing facility 103, and it may be split a number of times to distribute the signal to various homes 102 in the vicinity (which may be many miles) of the processing facility 103. Although the term home is used by way of example, locations 102 may be any type of user premises, such as businesses, institutions, etc. The links 101 may include components not illustrated, such as splitters, filters, amplifiers, etc. to help convey the signal clearly, but in general each split introduces a bit of signal degradation. Portions of the links 101 may also be implemented with fiber-optic cable, while other portions may be implemented with coaxial cable, other links, or wireless communication paths.

The processing facility 103 may include a termination system (TS) 104, such as a cable modem termination system (CMTS), which may be a computing device configured to manage communications between devices on the network of links 101 and backend devices such as servers 105-107 (to be discussed further below). The TS 104 may be as specified in a standard, such as, in an example of an HFC-type network, the Data Over Cable Service Interface Specification (DOCSIS) standard, published by Cable Television Laboratories, Inc. (a.k.a. CableLabs), or it may be a similar or modified device instead. The TS may be configured to place data on one or more downstream channels or frequencies to be received by devices, such as modems at the various homes 102, and to receive upstream communications from those modems on one or more upstream frequencies. The processing facility 103 may also include one or more network interfaces 108, which can permit the processing facility 103 to communicate with various other external networks 109. These networks 109 may include, for example, networks of Internet Protocol devices, telephone networks, cellular telephone networks, fiber optic networks, local wireless networks (e.g., WiMAX), satellite networks, and any other desired network, and the interface 108 may include the corresponding circuitry needed to communicate on the network 109, and to other devices on the network such as a cellular telephone network and its corresponding cell phones, or other network devices. For example, the network 109 may communicate with one or more content sources, such as multicast or unicast video sources, which can supply video streams for ultimate consumption by the various devices in the homes 102.

As noted above, the processing facility 103 may include a variety of computing devices such as servers 105-107 that may be configured to perform various functions. For example, the processing facility 103 may include a push notification server 105 that can generate push notifications to deliver data and/or commands to the various homes 102 in the network (or more specifically, to the devices in the homes 102 that are configured to detect such notifications). The processing facility 103 may also include a content server 106 configured to provide content to users in the homes. This content may be, for example, video on demand movies, television programs, songs, text listings, etc. The content server may include software to validate user identities and entitlements, locate and retrieve requested content, encrypt the content, and initiate delivery (e.g., streaming) of the content to the requesting user and/or device.

The processing facility 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server 107 may be used to implement a cache server for the content found on the content server 106. Other example application servers may be responsible for collecting data such as television program listings information and generating a data download for electronic program guide listings. Another application server may be responsible for monitoring user viewing habits and collecting that information for use in selecting advertisements. Another application server may be responsible for formatting and inserting advertisements in a video stream being transmitted to the homes 102. And as will be discussed in greater detail below, another application server may be responsible for receiving user remote control commands, and processing them to provide an intelligent remote control experience.

An example home 102a may include a gateway device 111, which may include an interface 120 comprising a modem and/or a gateway device 111. The modem 110 may include transmitters and/or receivers used to communicate on the links 101 and with the processing facility 103. The modem 110 may be, for example, a coaxial cable modem (for coaxial cable links 101), a fiber interface node (for fiber optic links 101), or any other desired device having similar functionality. The gateway device 111 may be connected to, or be a part of, a gateway interface device. The gateway interface device may be a computing device that communicates with the gateway device 111 to allow one or more other devices in the home to communicate with the processing facility 103 and other devices beyond the local office. The gateway device 111 may be a set-top box (STB), digital video recorder (DVR), computer server, or any other desired computing device. The gateway device 111 may also include (not shown) local network interfaces to provide communication signals to devices in the home, such as televisions 112, additional STBs 113, personal computers 114, laptop computers 115, wireless devices 116 and/or 117 (wireless laptops and netbooks, mobile phones, mobile televisions, personal digital assistants (PDA), etc.), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11), Bluetooth interfaces, and others. Any of the devices in the home, such as the gateway 111, STB 113, computer 114, etc., can include an application software client that can make use of the video images captured by the image capture servers.

Figure 2:
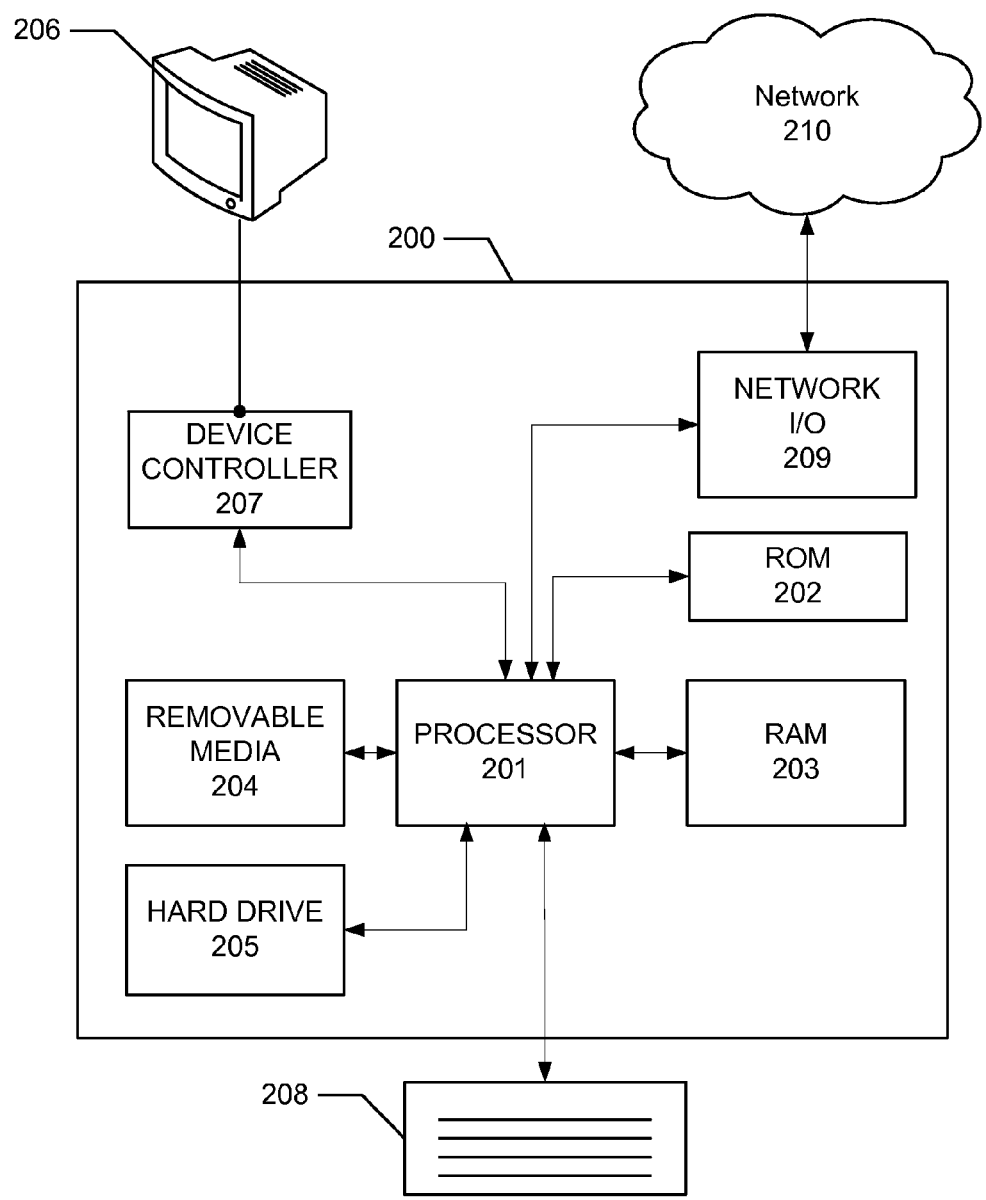
FIG. 2 illustrates an example hardware and/or software platform on which the various elements described herein can be implemented.

FIG. 2 illustrates, by way of example, general hardware elements that can be used to implement any of the various computing devices and/or software discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, hard drive, removable media 204, such as a Universal Serial Bus (USB) drive, compact disk (CD) or digital versatile disk (DVD), floppy disk drive, or any other desired electronic storage medium. Instructions may also be stored in an attached (or internal) hard drive 205. The computing device 200 may include one or more output devices, such as a display 206 (or an external television), and may include one or more output device controllers 207, such as a video processor. There may also be one or more user input devices 208, such as a remote control, keyboard, mouse, touch screen, microphone, etc. The computing device 200 may also include one or more network interfaces, such as input/output circuits 209 (such as a network card) to communicate with an external network 210. The network interface may be a wired interface, wireless interface, or a combination of the two. In some embodiments, the interface 209 may include a modem (e.g., a cable modem), and the network 210 may include the communication links 101 discussed above, the external network 109, an in-home network, a provider's wireless, coaxial, fiber, or hybrid fiber/coaxial distribution system (e.g., a DOCSIS network), or any other desired network.

Figure 3:
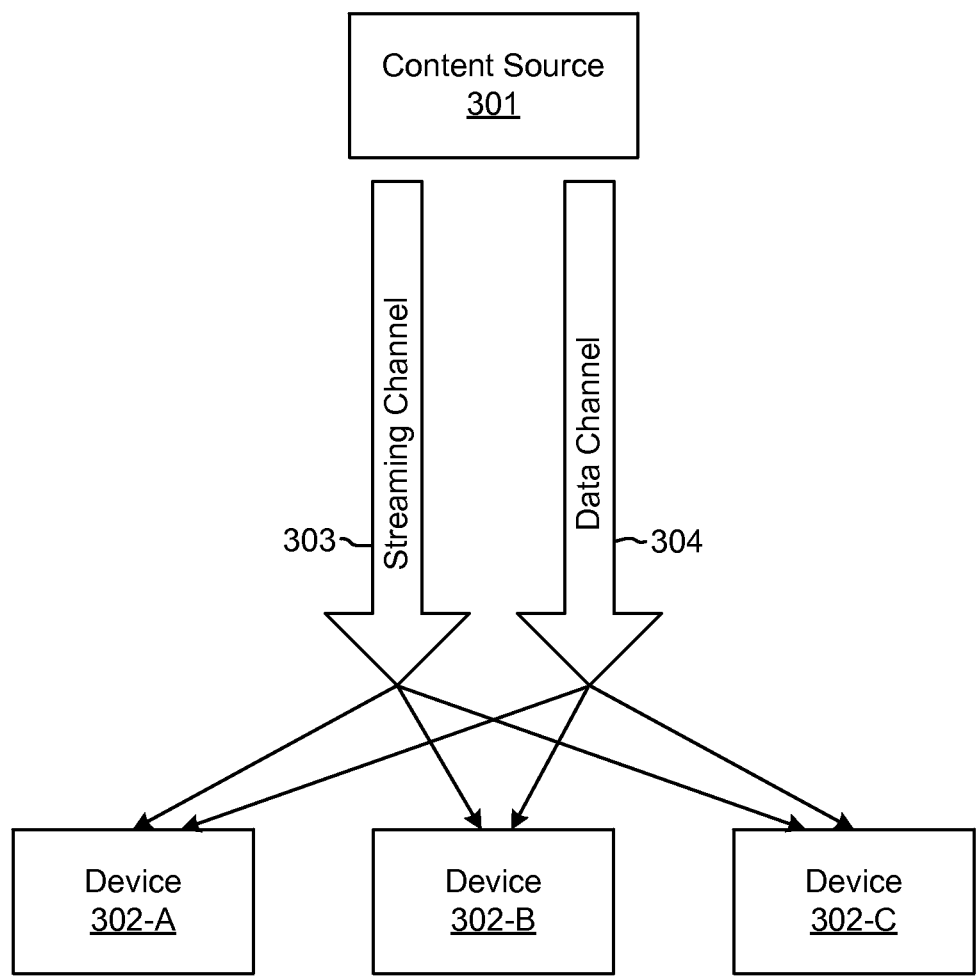
FIG. 3 illustrates an example of architecture and data flow in accordance with one or more aspects as described herein.

FIG. 3 illustrates an example architecture and data flows for providing data to one or more devices (e.g., user devices, network devices, clients, etc.), in accordance with one or more aspects as described herein. In the example of FIG. 3, a content source 301 (such as a content provider and/or data storage) may send data to one or more devices, shown by way of example as devices 302-A, 302-B, and 302-C. Devices 302 may be any types of devices, including but not limited to any of elements 110-117 (FIG. 1). Content source 301 may be or otherwise include, for example, the processing facility 103, TS 104, and/or any other equipment configured to send data over a link to devices such as the one or more devices 302. The data may be sent (e.g., over link 101) in one or more channels, shown by way of example here as streaming channel 303 and data channel 304. The channels may be physically distinct from each other. For instance, the various channels may each utilize a different communication resource such as different frequency spectrums (e.g., contained in different QAM channels), different transmission media, and/or different time slices. The channels may additionally or alternatively be logically distinct from each other. For instance, the various channels may or may not utilize identical communications resources, and may distinguish from each other such as by using unique data packet headers (e.g., different program IDs, or PIDs).

As can be seen from FIG. 3, each of the devices 302 may be able to receive (e.g., tune to) data over both streaming channel 303 and data channel 304, as desired. Moreover, each of the devices 302 may be able to receive data from both channels 303 and 304 simultaneously. As previously mentioned, various forms of content, and their communication paths, may originate from the same source or from different sources. For example, channels 303 and 304 may originate from the same source (e.g., from a local office) and/or from different sources (e.g., from a local office and from a central office).

Streaming channel 303 may be configured to allow content source 301 to send data as one or more items of streamed content. That is, content data may be sent as an ongoing audio and/or video feed that is simultaneously rendered (e.g., displayed and/or otherwise presented) in real time as audio and/or video to the user of the device 302. The rendering at the device 302 may or may not be delayed with respect to the received content. For instance, where the content is being streamed from a QAM (such as at the processing facility 103), the rendering may be immediate without client-side buffering. As another example, where the content is being streamed as an IP stream (such as from a server), the rendering may be locally buffered by the device 302 such as in a FIFO short buffer, resulting in a slight delay (e.g., a few seconds) between receipt and rendering of content by the device 302.

Generally, streamed content may be sent by content source 301 at a real-time rate such that the content may be sent by content source 301 at the same or very similar rate (e.g., video frame rate, bit rate, etc.) that the content is presented to the user. Streamed content may be sent over streaming channel 303 in a predetermined data format and/or using a predetermined protocol used for streaming content. Moreover, streaming channel 303 may have one or more predetermined requirements or other policies, such as a particular quality of service (QoS) policy. The QoS policy may be one that helps ensure that content can be reliably streamed at a given rate over streaming channel 303, such as by guaranteeing a minimum amount of bandwidth for streamed content. Other than in a relatively small buffer (storing e.g., the next few seconds or minutes of the content), the bulk of streamed content may or may not be stored at device 302. As content is pushed into one end of the buffer (e.g., a FIFO buffer), the content at the other end of the buffer may be simply pushed out and lost (e.g., not stored in other storage of device 302). Thus, in some examples, such as where content is delivered by IP streaming, there may be limited buffering of the content at the device 302 before playback begins at the device 302. In other examples, such as where the content is streamed over QAM (e.g., video-on-demand content), content may not be buffered at all by the device 302. In such a case, playback at the device 302 may begin immediately upon receipt of the content by the device 302.

Data channel 304 may be configured to allow content source 301 to send data that is not necessarily intended to be streamed. For example, the data may be sent as one or more files that are downloaded to and stored at the device 302. In this case, it may be expected that a large portion, if not all, of the downloaded content is to be stored by the device 302. Rather than merely storing a small window of content in the above-mentioned client-side buffer, the content may be stored in more permanent storage suitable for later viewing. For example, the downloaded content may be stored in a memory and/or on a hard drive. Data channel 304 may provide, for example, IP file downloading, such as from a web server or other type of server. Data channel 304 may have certain requirements that are different from the requirements of streaming channel 303. For example, while streaming channel 303 may have a particular QoS policy that is suitable for streaming, data channel 304 may not have this particular QoS policy. This is because it may be less important that data downloaded on data channel 304 be sent over a particular timeframe and/or at a particular rate. As another example, data channel 304 may not provide a minimum guaranteed bandwidth for a particular item of downloaded content, and may instead, say, send the content in bursts as bandwidth becomes available on data channel 304. It is possible that data sent over data channel 304 may, on average, be sent at a significantly higher rate than real time (or, in some cases, at a significantly lower rate than real time). In most cases, over a sufficiently long time window (e.g., the extent of a television show or movie), it may be expected that content may be sent over data channel 304 at a significantly higher average rate (e.g., at least double the average rate, or at least triple the average rate) as content streamed over streaming channel 303.

Figure 4:
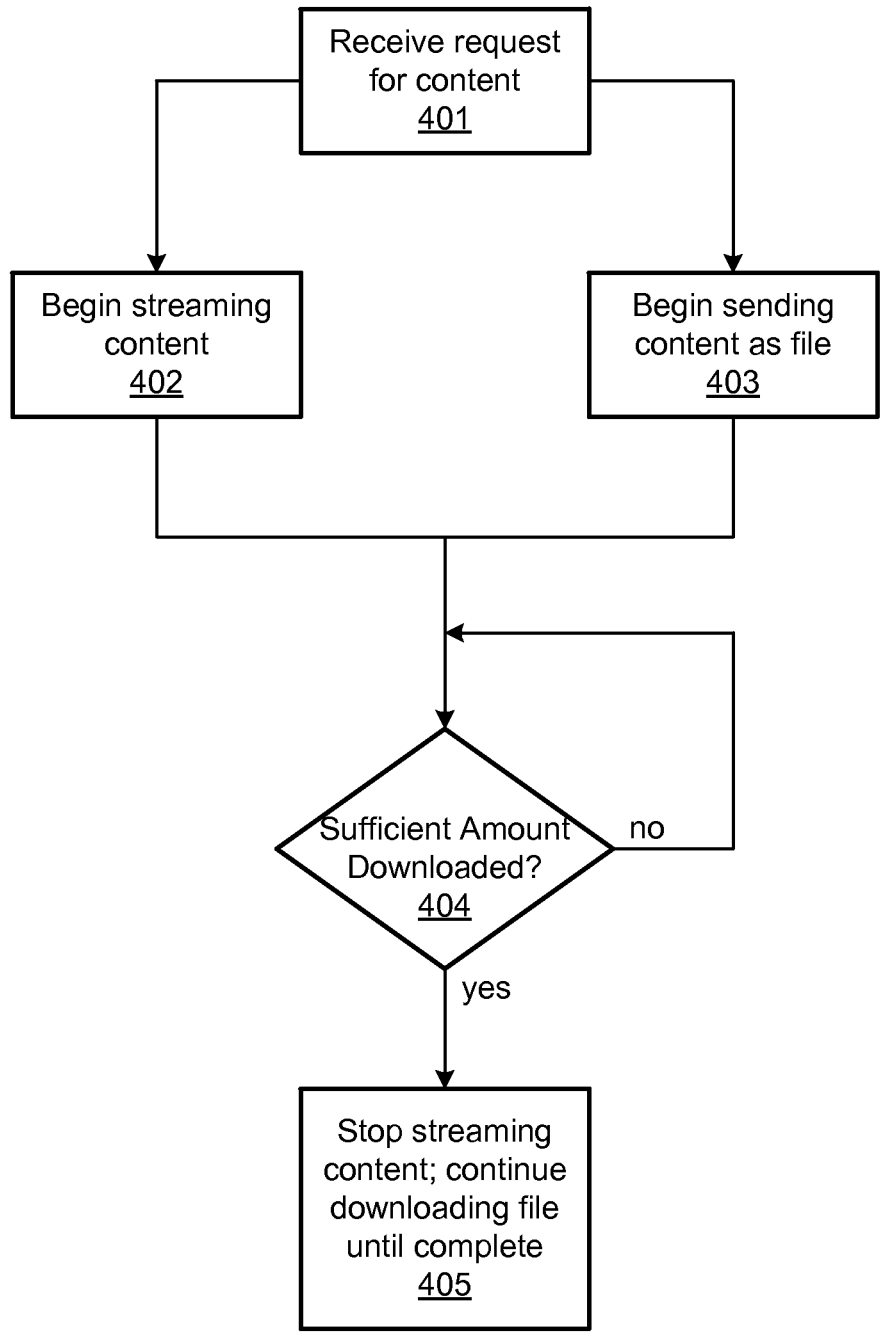
FIG. 4 is a flow chart showing an example process that may be performed in accordance with one or more aspects as described herein.

FIG. 4 is a flow chart showing an example process that may be performed in accordance with one or more aspects as described herein. The process includes steps that may be used for, e.g., providing content to one or more devices by both streaming and downloading the content. The various steps in the flow chart may be partially or fully performed by one or more devices, such as any of the elements of FIG. 1, and/or performed by and/or controlled by humans. While certain steps may be described below as being performed by a specific element, it will be understood that this is merely an example, and that each step may be performed by alternative elements. Moreover, while the steps are shown in a particular order and divided into specific steps, it will be understood that the order may be modified, and that one or more of the steps may be combined and that one or more of the steps may be further sub-divided into further steps.

At step 401, a request for a particular item of content may be received by, for example, the content source 301 (e.g., one or more of servers 105, 106, and/or 107, a data store, and/or any other network device). The request may originate from one of the devices (e.g., device 302-A), and/or the request may be provided to content source 301 from any device within or outside the system of content source 301. In some examples, the request may be sent as a command or other data upstream via link 101 or another communication link.

In response to the request, content source 301 may obtain the requested content (e.g., by retrieving a pre-stored version of the content and/or by generating the content), and at steps 402 and 403, content source 301 may begin providing the requested content to device 302 (e.g., the device that originated the request) or an intermediate network device. In particular, at step 402, content source 301 may stream (e.g., via TS 104) the content over streaming channel 303 to the device 302 (e.g., 302-A). The streamed content may be rendered by a user device, e.g., the device 302, immediately upon receipt or after a small amount of buffering, depending upon the configuration of the device 302 and/or the method of streaming. In addition, at step 403, content provider may send (e.g., download via TS 104) the content over data channel 304 to the same device 302-A. The streaming of step 402 and the downloading of step 403 may be performed at least partially at the same time. In some examples, the streaming and downloading may begin simultaneously. In other examples, either the streaming or the downloading may begin first, with the other beginning afterward. In both cases, there may be partial or complete overlap in time of the streaming and the downloading to the device 302-A in steps 402 and 403.

Figure 5:
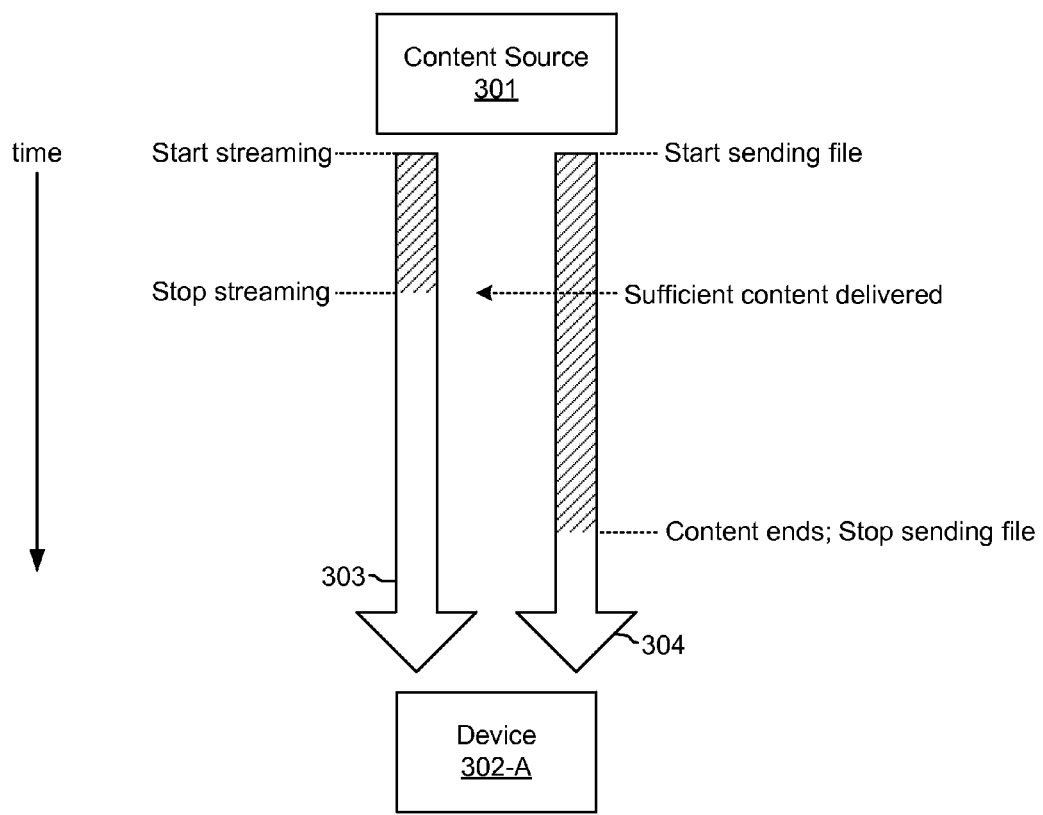
FIG. 5 illustrates an example timeline of providing content to a device in accordance with one or more aspects as described herein.

An example of a manner in which content may be provided is shown in the timeline of FIG. 5. Here, time goes forward in the downward direction of the arrows representing channels 303 and 304, and the shaded regions of the arrows represent sending of content such as by streaming or downloading. Thus, in this example, it can be seen that sending (e.g., streaming) in channel 303 and sending (e.g., downloading) in channel 304 begin simultaneously (or nearly so).

Returning to FIG. 4, the process continues to step 404, which continues to check for whether a sufficient amount of the content has been delivered over data channel 304 to the device 302-A before proceeding to step 405. At step 404, it may be determined that a sufficient amount of content has been delivered over data channel 304 when at least a predetermined threshold amount (e.g., a threshold number or percentage of bits, bytes, and/or video frames) of the content has been delivered over data channel 304 to the device 302-A. For example, the threshold amount may be X % (e.g., 5%, 25%, or 100%) of the total amount of data in the item of content, or Y number of bits, delivered. In some examples, the threshold amount may be fixed. In other examples, the threshold amount may vary in real time and may be determined based on, e.g., the measured available bandwidth of data channels 303 and/or 304. In some examples, content source 301 (e.g., severs 105, 106, and/or 107) may perform the determination in step 404 of whether a sufficient amount of the content has been downloaded. In other examples, the determination in step 404 may be performed by the device (e.g., the device 302-A), and/or by some other intervening device in link 101.

Step 404 may be performed on a continuous or intermittent basis (e.g., periodically), and the streaming and downloading of steps 402 and 403 may continue, until it is determined at step 404 that sufficient content has been delivered to the device 302-A. In response to this determination, content source 301 may stop the streaming of the content and continue the downloading of the content until the downloading is complete. In the example of FIG. 5, it can be seen that the content stops streaming over streaming channel 303 in response to determining that a sufficient amount of the content has been delivered, and that the content continues to be downloaded over data channel 304. Where the determining in step 404 is performed at the client side (e.g., by device 302-A), the device 302-A may send a signal upstream (e.g., via link 101) to content source 301 indicating that sufficient content has been received. Thus, in such a case, step 405 may be performed in response to the upstream signal.

Figure 6:
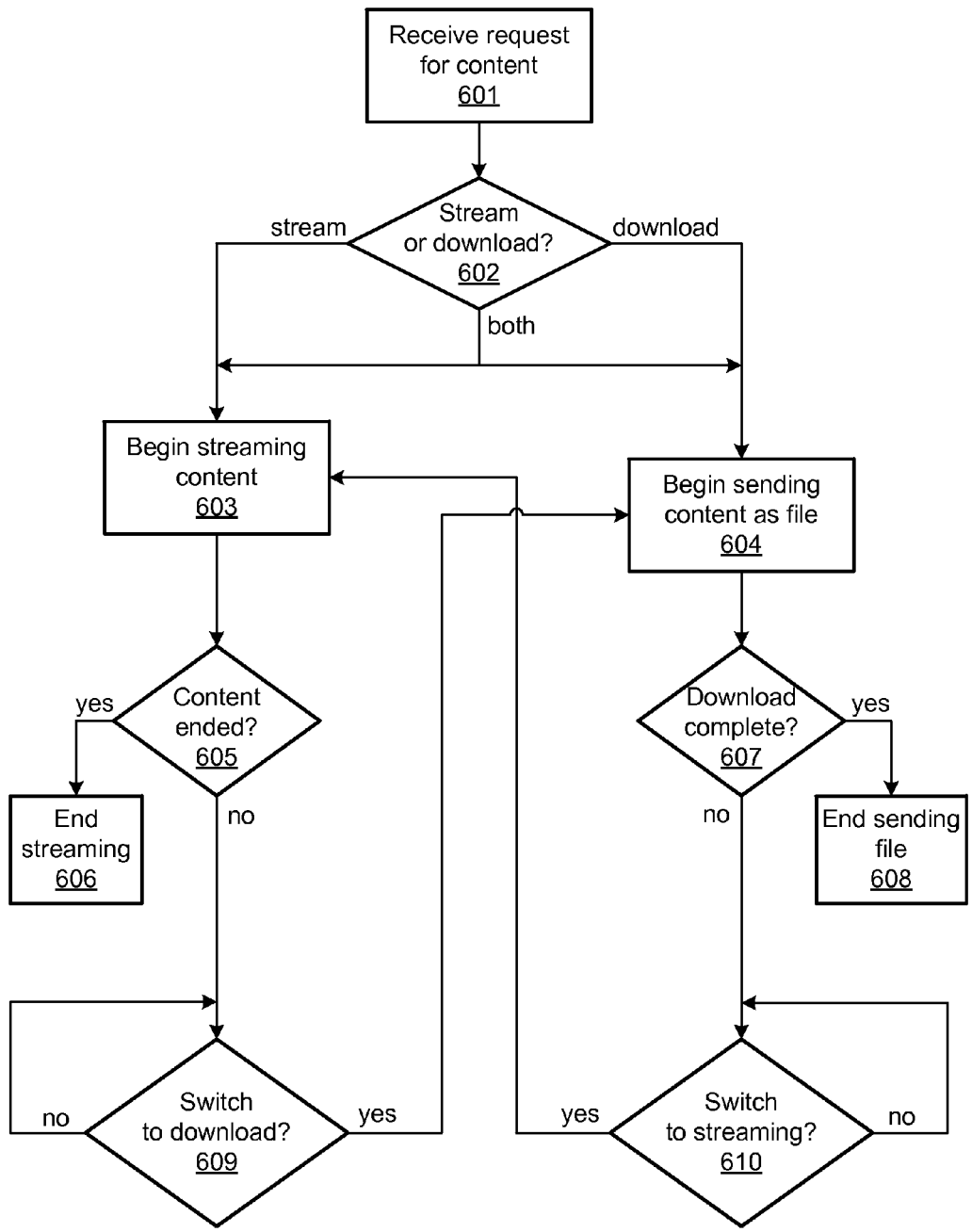
FIG. 6 is a flow chart showing another example process that may be performed in accordance with one or more aspects as described herein.

FIG. 6 is another flow chart showing another example process that may be performed in accordance with one or more aspects as described herein. The process includes steps that may be used for, e.g., providing content to one or more devices by both streaming and downloading the content. The various steps in the flow chart may be partially or fully performed by one or more devices, such as any of the elements of FIG. 1, and/or performed by and/or controlled by humans. While certain steps may be described below as being performed by a specific element, it will be understood that this is merely an example, and that each step may be performed by alternative elements. Moreover, while the steps are shown in a particular order and divided into specific steps, it will be understood that the order may be modified, and that one or more of the steps may be combined and that one or more of the steps may be further sub-divided into further steps.

At step 601 (similar to step 401), content source 301 may receive a request for a particular item of content. Again, the request may originate from one of the devices (e.g., the device 302-A), and/or the request may be provided to content source 301 from any device within or outside the system of content source 301. In some examples, the request may be sent as a command or other data upstream via link 101 or another communication link.

In response to the request, content source 301 (e.g., servers 105, 106, and/or 107) may obtain the requested content (e.g., by retrieving a pre-stored version of the content and/or by generating the content), and determine whether the content should be streamed (e.g., on streaming channel 303), downloaded (e.g., on data channel 304), or both. The determination at step 602 may be made based on, for instance, the measured available bandwidth of channels 303 and/or 304, the type of request from the device 302-A, the size of the content data, the type of the content data, and/or other factors. For example, if it is determined that there is insufficient bandwidth available in streaming channel 303 to add another stream, then it may be determined at step 602 that the content should (at least initially) only be downloaded to the device 302-A. On the other hand, if it is determined at step 602 that there is insufficient bandwidth available in data channel 304 and sufficient bandwidth to add a stream to streaming channel 303, then it may be determined at step 602 that the content should (at least initially) only be streamed to the device 302-A. As a third example, if it is determined at step 602 that there is sufficient bandwidth in both channels 303 and 304, it may be determined that the content should (at least initially) be both streamed and downloaded to the device 302-A. The determination at step 602 may be made by, for instance, predetermined or dynamically-managed business rules.

At steps 603 and 604, the content is either streamed to the device 302-A over streaming channel 303, downloaded to the device 302-A over data channel 304, or both during the same timeframe (e.g., partially or fully simultaneously.

At step 605, if it is determined that the streamed content has ended (e.g., naturally came to the end of the content) or was stopped for some other reason, then streaming ends at step 606. Likewise, if it is determined that the downloaded content has been fully downloaded, then downloading ends at step 607.

At step 609, it is determined whether the currently-streamed content should be switched to downloading mode—that is, whether the streaming should end and be replaced with downloading (which may or may not already be in progress from step 604). Likewise, at step 610, it is determined whether the currently-downloaded content should be switched to streaming mode—that is, whether the downloading should end and be replaced with streaming.

The determinations at steps 609 and 610 may be made by content source 301 and/or at the client side such as by the device 302-A and/or gateway 111. As to the determination of step 609 (switch to download mode), events that may trigger such a switch may include, for instance, determining that a measured bandwidth of streaming channel 303 has dropped below a predetermined threshold bandwidth and/or receiving a command to switch to downloading that was issued upstream by the device 302-A. As to the determination of step 610 (switch to streaming mode), events that may trigger such a switch may include, for instance, determining that a measured bandwidth of data channel 304 has dropped below a predetermined threshold bandwidth and/or receiving a command to switch to streaming that was issued upstream by the device 302-A.

If, at step 609, it is determined to switch to downloading, then the streaming of the content may end and the downloading of the content may either continue (if already occurring) or begin. If it begins, then the downloading may begin at a location within the content (e.g., at a video frame of the content) that depends upon when the streaming ended and/or when the determination to switch was made. For instance, if streaming ends at a particular location within the content, then the downloading may begin at that particular location, at a location beginning a predetermined amount of time before the location, or at a location beginning a predetermined amount of time after the location. In any event, it may be desirable to make the switch so that the switch appears seamless to the user of the device 302-A.

If, at step 610, it is determined to switch to streaming, then the downloading of the content may or may not end and the streaming of the content may begin. The streaming may begin at a location within the content (e.g., at a video frame of the content) that depends upon when the downloading ended (if at all) and/or when the determination to switch was made. For instance, if the content is to be switched from downloading mode at a particular location within the content, then the streaming may begin at that particular location, at a location beginning a predetermined amount of time before the location, or at a location beginning a predetermined amount of time after the location. In any event, it may be desirable to make the switch so that the switch appears seamless to the user of the device 302-A. Even after the switch, downloading may continue in parallel if desired.

Figure 7:
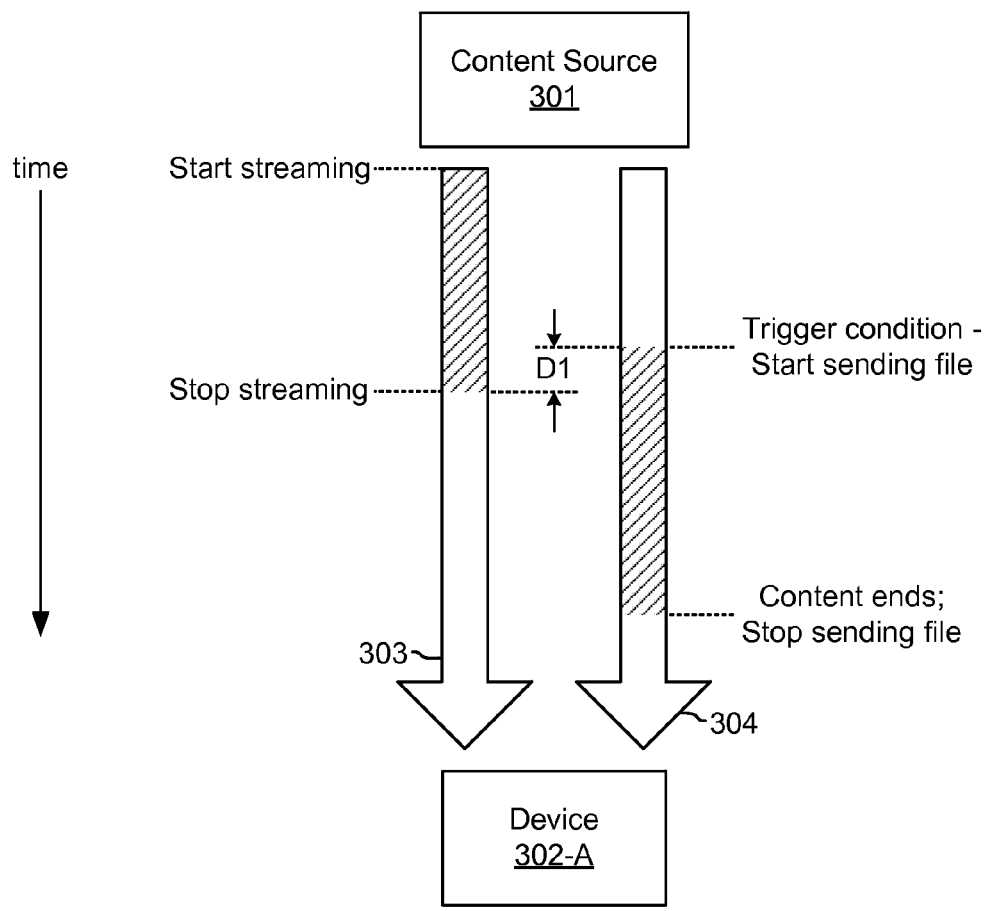
FIG. 7 illustrates an example timeline of providing content to a device in accordance with one or more aspects as described herein.

FIG. 7 illustrates another example timeline of content being streamed and sent as a file to the same device, in accordance with one or more aspects as described herein. In this example, the delivering of the content to the device 302-A follows the process of FIG. 6. Here, it is determined at step 602 to begin only streaming the content, as indicated in FIG. 7 by the shading in the upper portion of streaming channel 303. At some point in time, a trigger condition is determined (e.g., it is determined that streaming channel 303 has a bandwidth that has dropped below the threshold). In response to the trigger condition, streaming is stopped at step 609, and downloading begins at step 604. This is also indicated in FIG. 7 using shading in the respective channels 303, 304. It is also shown in FIG. 7 that a delay D1 may exist between the beginning of downloading and the stopping of streaming. The delay D1 may be imposed to better allow for a seamless user experience. For instance, it may not be desirable to start presenting the downloaded content to the user until the device 302-A has downloaded enough content. The delay D1 may be fixed or variable, and may be short or long. For example, the delay D1 may be on the order of at least fifty milliseconds or at least five seconds, or even longer. The delay D1 may even be zero (no delay). It may be expected that the delay D1 may be relatively shorter (e.g., less than one second) for QAM streaming and relatively longer (e.g., more than a few seconds) for IP streaming, however this may not necessarily be the case.

Figure 8:
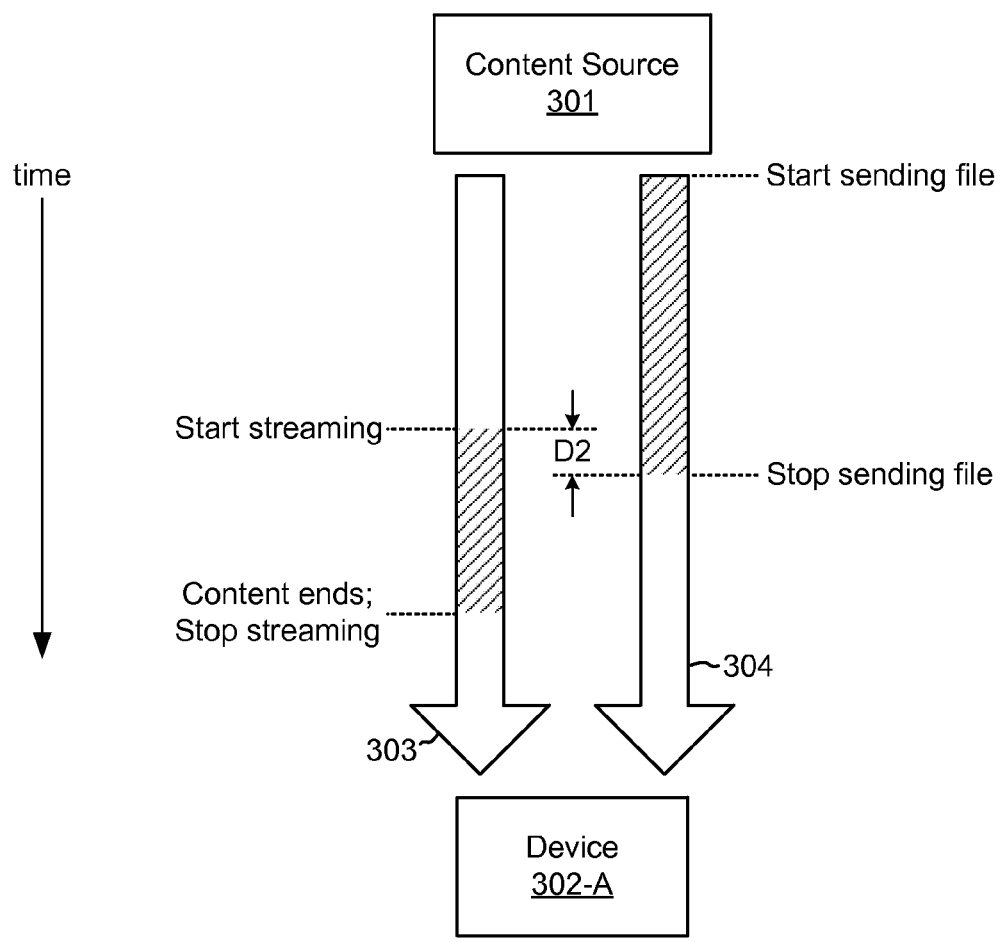
FIG. 8 illustrates an example timeline of providing content to a device in accordance with one or more aspects as described herein.

FIG. 8 illustrates still another example timeline of content being streamed and sent as a file to the same device, in accordance with one or more aspects as described herein. In this example as well, the delivering of the content to the device 302-A follows the process of FIG. 6. Here, it is determined at step 602 to begin only downloading the content, as indicated in FIG. 8 by the shading in the upper portion of data channel 304. At some point in time, a trigger condition is determined (e.g., it is determined that data channel 304 has a bandwidth that has dropped below the threshold). In response to the trigger condition, downloading is stopped at step 610 (although it does not necessarily need to stop), and streaming begins at step 603. This is also indicated in FIG. 8 using shading in the respective channels 303, 304. It is also shown in FIG. 8 that a delay D2 (which may or may not equal D1) may or may not also exist between the beginning of streaming and the stopping of downloading (if any).

Figure 9:
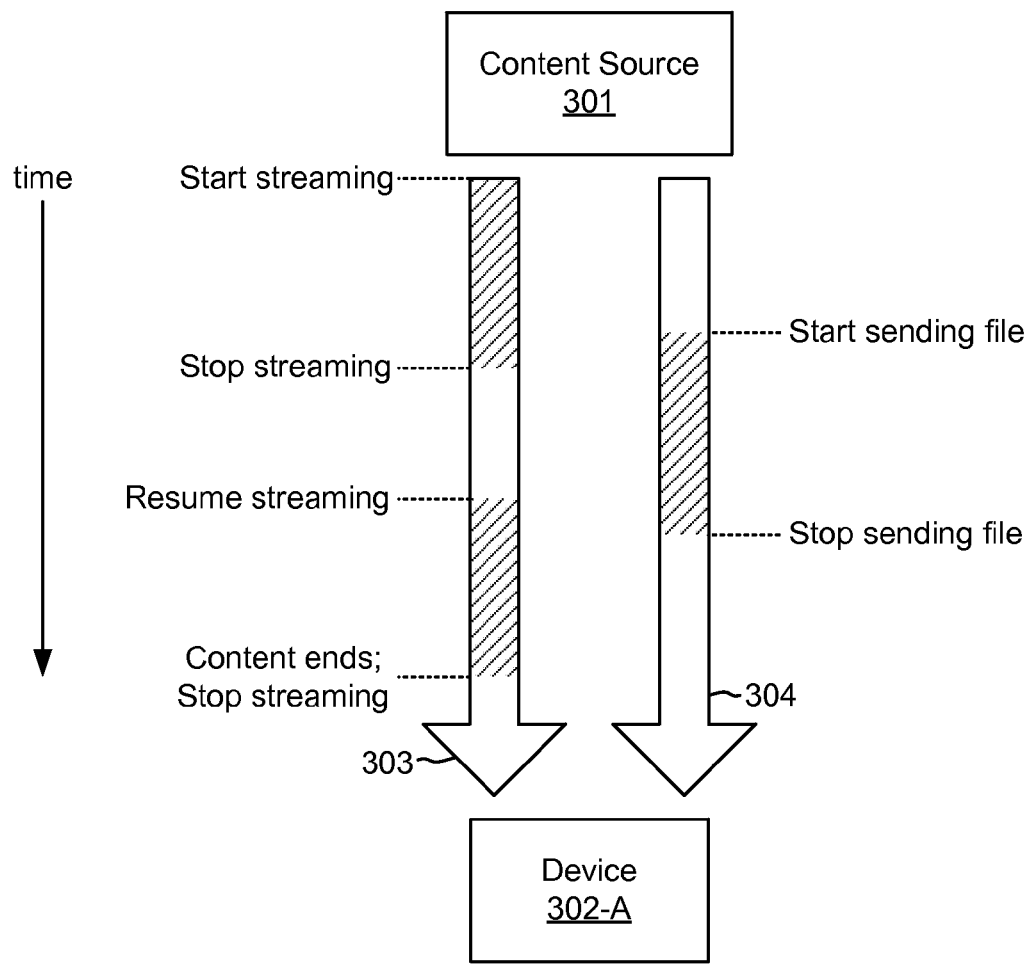
FIG. 9 illustrates an example timeline of providing content to a device in accordance with one or more aspects as described herein.

FIG. 9 illustrates yet another example timeline of content being streamed and sent as a file to the same device, in accordance with one or more aspects as described herein. In this example as well, the delivering of the content to the device 302-A follows the process of FIG. 6. Here, it is determined at step 602 to begin only streaming the content, as indicated in FIG. 9 by the shading in the upper portion of streaming channel 303. At some point in time, a first trigger condition is determined (e.g., it is determined that streaming channel 303 has a bandwidth that has dropped below the threshold). In response to the trigger condition, streaming is stopped at step 609, and downloading begins at step 604. This is also indicated in FIG. 9 using shading in the respective channels 303, 304. At a later point in time, a second trigger condition is determined (e.g., it is determined that data channel 304 has a bandwidth that has dropped below the threshold). In response to the trigger condition, downloading is stopped at step 610 (although it does not necessarily need to stop), and streaming begins at step 603. This is also indicated in FIG. 9 using shading in the respective channels 303, 304. The delays D1 and/or D2 may also exist during the transitions between streaming and the stopping of downloading (if any), and between downloading and stopping of streaming.

It is noted that the process of FIG. 6 may also be used to result in the delivering of content as shown in the timeline of FIG. 5. In this case, it may be determined at step 602 that the content should initially be both downloaded and streamed. And, at steps 609 and 610, streaming may be stopped even though downloading may continue.

Figure 10:
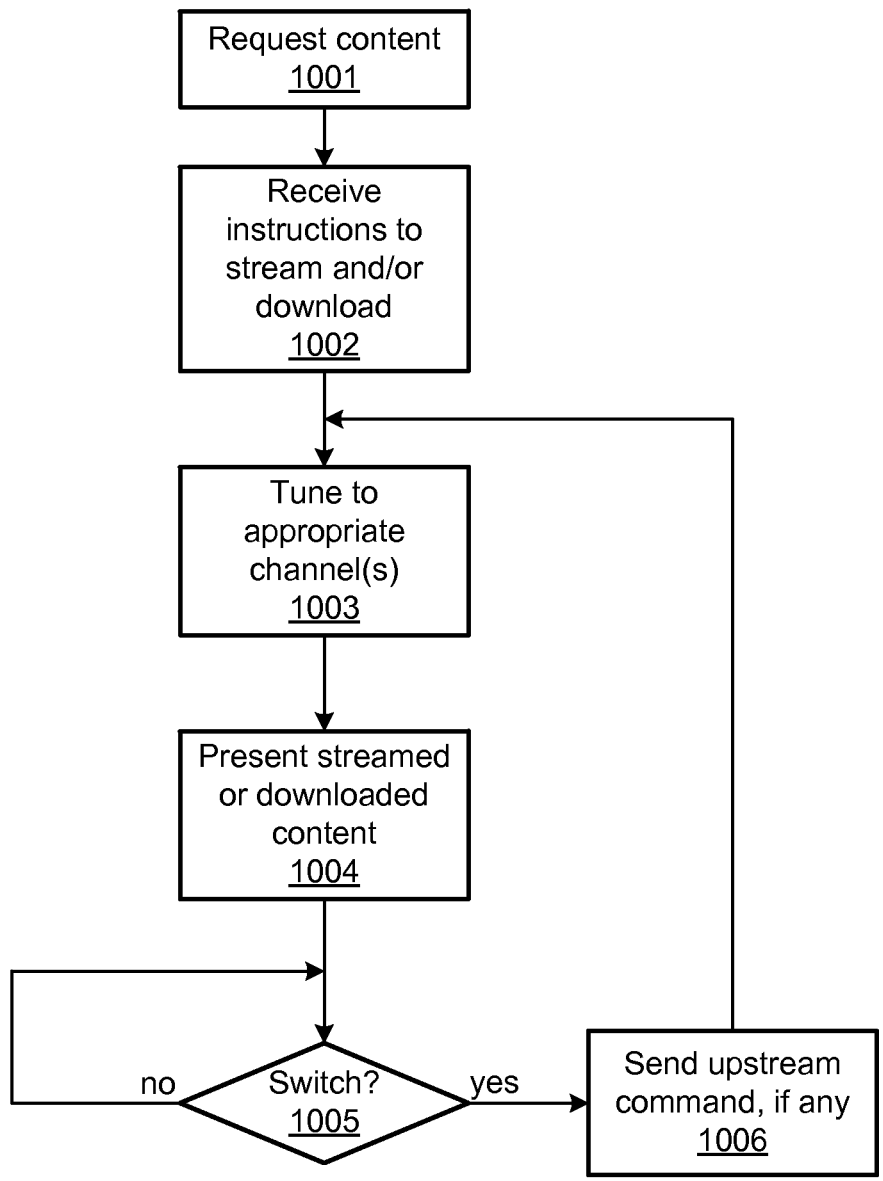
FIG. 10 is a flow chart showing an example process that may be performed in accordance with one or more aspects as described herein.

FIG. 10 is a flow chart showing still another example process that may be performed in accordance with one or more aspects as described herein. The process includes steps that may be used by a device for, e.g., receiving and presenting both streamed and downloaded content. The various steps in the flow chart may be partially or fully performed by one or more devices, such as any of the elements of FIG. 1, and/or performed by and/or controlled by humans. While the steps are shown in a particular order and divided into specific steps, it will be understood that the order may be modified, and that one or more of the steps may be combined and that one or more of the steps may be further sub-divided into further steps.

At step 1001, the device (e.g., the device 302-A) may request a particular item of content, such as by sending a request message over link 101 to content source 301. This may be, for instance, the request that is received by content source 301 during steps 401 and 601. The request may be initiated automatically by the device or in response to a user selection at the device.

At step 1002, the device may receive a command or other message from content source 301 (e.g., over link 101) with instructions indicating whether the device is to tune to streamed content (e.g., on streaming channel 303) and/or to tune to content for downloading (e.g., on data channel 304). The message may also indicate the type of streaming (e.g., IP streaming versus QAM streaming) and/or the type of downloading (e.g., IP file downloading) to be used by the device. In addition, the message from content source 301 may indicate whether the device is to present (e.g., display) the streamed content or the downloaded content to the user. The latter may be desirable where the device is commanded to tune to and receive both the streamed and downloaded content on both channels 303, 304. For instance, with reference to the example timeline of FIG. 5, the device may be commanded by the content source 301 to receive, during the same timeframe, both the streamed version of the content and the downloaded version of the content, although the device is to present (at least initially) only the streamed version of the content. The downloaded version of the content may be simply stored for later use.

At step 1003, the device may tune to the appropriate one or more channels for the desired versions of content (e.g., for streaming and/or downloading). At step 1004, the device may begin presenting (e.g., displaying) the appropriate version of the content to the user, with or without client-side buffering.

At step 1005, the device may determine whether the device should switch which version of the content is to be presented to the user and/or which version(s) of the content are to be tuned to. This determination at step 1005 may be made based on any of a number of factors, such as but not limited to whether sufficient content has been downloaded over data channel 304 (see, e.g., the previous discussion with regard to step 404), whether the available bandwidth of streaming channel 303 and/or data channel 304 is sufficient, a command from content source 301, and/or a command from the user of the device. Moreover, the determination at step 1005 may be made by the device, by content source 301, or as a result of collaboration between the two. Thus, for instance, the content source 301 may have a system with the intelligence to instruct the device which methods to use (e.g., streaming and/or downloading) and/or when to use the methods. If no switching is to occur as determined at step 1005, then the process continues as is until the content ends, it is determined that switching is to occur, or some other event modifies the process (e.g., the user selects a "stop" command).

If it is determined at step 1005 that switching is to occur, then step 1006 may be performed if, for instance, step 1005 is performed by the device. Step 1006 may involve the device sending a command or other message to content source 301 that the content is to be provided in some other manner. For instance, if the content is currently only being streamed, then the message sent upstream may request that content source 301 switch to only downloading or to both streaming and downloading. If the content is currently only being downloaded, then the message sent upstream may request that content source 301 switch to only streaming or to both streaming and downloading. If the content is concurrently being downloaded and streamed, then the message sent upstream may request that content source 301 switches to only streaming or to only downloading. If the determination at step 1005 is made by content source 301, then it may be desirable not to perform step 1006.

Upon performing step 1005 (and possibly also step 1006), the process may return to step 1003, in which the device may adjust how it tunes to the various channels 303 and/or 304 as appropriate for the manner in which the content is being delivered to the device.

The various features described above are merely non-limiting examples, and can be rearranged, combined, sub-divided, omitted, and/or altered in any desired manner. For example, features of the servers can be subdivided among multiple processors and computing devices. The true scope of this patent should only be defined by the claims that follow.

What is claimed is:
1. A system comprising:
  a first computing device comprising:
    one or more first processors; and
    first memory, the first memory storing first instructions that, when executed by the one or more first processors, cause the first computing device to:
      stream first data representing at least a first portion of content to a second computing device, wherein the content comprises the first portion, a second portion, and a third portion;

send, at least partially during a same timeframe as the streaming, second data representing at least the second portion of the content to the second computing device; and stop streaming the first data, based on an indication that a threshold amount of the second data has been sent; and the second computing device comprising:
one or more second processors; and
second memory, the second memory storing second instructions that, when executed by the one or more second processors, cause the second computing device to:
send the indication that the threshold amount of the second data has been sent, wherein the threshold amount corresponds to the first portion and the second portion.

2. The system of claim 1, wherein the second portion of the content includes at least some of the first portion of the content.

3. The system of claim 1, wherein the second data represents the first portion, the second portion, and the third portion.

4. The system of claim 1, wherein the first data and the second data represent the content at a same level of video quality.

5. The system of claim 1, wherein the first instructions, when executed by the one or more first processors, cause the first computing device to receive a request from the second computing device for the content, and wherein the first instructions, when executed by the one or more first processors, cause the first computing device to stream the first data and send the second data by initiating, based on the request, streaming of the first data and sending of the second data.

6. The system of claim 1, wherein the first instructions, when executed by the one or more first processors, cause the first computing device to stream the first data by streaming the first data over a communication link to the second computing device, wherein the first instructions, when executed by the one or more first processors, cause the first computing device to:
determine an amount of usage of the communication link; and
determine, based on the determined amount of usage, whether to initiate sending of the second data, and
send the second data by initiating, based on determining that the sending is to be initiated, the sending.

7. The system of claim 1, wherein the first instructions, when executed by the one or more first processors, cause the first computing device to send the second data by uploading the second data to the second computing device.

8. The system of claim 1, wherein the first instructions, when executed by the one or more first processors, cause the first computing device to stop the streaming by stopping the streaming while sending the second data, and wherein the first instructions, when executed by the one or more first processors, cause the first computing device to send the second data by continuing to send the second data.

9. The system of claim 1, wherein the threshold amount is less than an entirety of the content.

10. A system comprising:
a first computing device comprising:
one or more first processors; and
first memory, the first memory storing first instructions that, when executed by the one or more first processors, cause the first computing device to:

stream first data representing at least a first portion of content over a communication link to a second computing device, wherein the content comprises the first portion, a second portion, and a third portion;
determine an amount of usage of the communication link;
determine, based on the determined amount of usage, whether to initiate sending second data;
send, based on determining that sending is to be initiated and at least partially during a same timeframe as the streaming, the second data representing at least the second portion of the content to the second computing device;
stop, during sending of the second data and based on an indication that a threshold amount of the second data has been sent, the streaming; and
continue the sending after stopping the streaming; and the second computing device comprising:
one or more second processors; and
second memory, the second memory storing second instructions that, when executed by the one or more second processors, cause the second computing device to:
send the indication that the threshold amount of the second data has been sent, wherein the threshold amount corresponds to the first portion and the second portion.

11. The system of claim 10, wherein the second portion of the content includes at least some of the first portion of the content.

12. The system of claim 10, wherein the second data represents both the first and second portions of the content.

13. The system of claim 10, wherein the first instructions, when executed by the one or more first processors, cause the first computing device to receive a request from the second computing device for the content, and wherein the first instructions, when executed by the one or more first processors, cause the first computing device to stream the first data and send the second data by initiating, based on the request, streaming of the first data and sending of the second data.

14. The system of claim 10, wherein the first instructions, when executed by the one or more first processors, cause the first computing device to send a value indicating the threshold amount to the second computing device.

15. A system comprising:
a first computing device comprising:
one or more first processors; and
first memory, the first memory storing first instructions that, when executed by the one or more first processors, cause the first computing device to:
send, over a communication link, first data representing at least a first portion of content to a second computing device;
determine an amount of usage of the communication link during the sending;
determine, based on the determined amount of usage, whether to initiate streaming; and
stream, to the second computing device and based on determining to initiate streaming, second data representing at least a second portion of the content the second computing device comprising:
one or more second processors; and second memory, the second memory storing second instructions that, when executed by the one or more second processors, cause the second computing device to:
stop, after the streaming is initiated, the sending and to continue the streaming after the sending is stopped.

16. The system of claim 15, wherein the first instructions, when executed by the one or more first processors, cause the first computing device to determine a starting point within the content based upon how much of the content was sent during the sending, and wherein the first instructions, when executed by the one or more first processors, cause the first computing device to stream the second data by streaming the second data beginning at the determined starting point.

17. The system of claim 15, wherein the first instructions, when executed by the one or more first processors, cause the first computing device to:
send the first data by sending the first data over a first channel of the communication link;
determine the amount of usage by determining the amount of usage within the first channel; and
stream the second data by streaming the second data over a second channel of the communication link, the second channel being different from the first channel.

18. The system of claim 15, wherein the first and second data represent the content at a same level of video quality.

19. The system of claim 15, wherein the second instructions, when executed by the one or more second processors, cause the second computing device to wait a predetermined period of time from an initiation of the streaming before performing the stopping.

20. The system of claim 15, wherein the second instructions, when executed by the one or more second processors, cause the second computing device to stop the sending by stopping the sending based on receiving a threshold amount of the second data during the streaming.

* * * * *

UNITED STATES PATENT AND TRADEMARK OFFICE
CERTIFICATE OF CORRECTION

PATENT NO. : 10,225,307 B2
APPLICATION NO. : 15/390007
DATED : March 5, 2019
INVENTOR(S) : Bradley et al.

Page 1 of 1

It is certified that error appears in the above-identified patent and that said Letters Patent is hereby corrected as shown below:

In the Claims

Column 14, Claim 15, Lines 64-65:
Please insert --;--, after "content"

Signed and Sealed this
Twenty-seventh Day of August, 2019

Andrei Iancu
*Director of the United States Patent and Trademark Office*